US011044233B2

(12) United States Patent
Martz et al.

(10) Patent No.: US 11,044,233 B2
(45) Date of Patent: *Jun. 22, 2021

(54) BROWSER SWITCHING SYSTEM AND METHODS

(71) Applicant: L3 Technologies, Inc., New York, NY (US)

(72) Inventors: Peter Martz, Marlton, NJ (US); Kenneth Moritz, Lansdowne, PA (US); Glenn Coleman, Berwyn, PA (US)

(73) Assignee: L3 Technologies, Inc., New York, NY (US)

( * ) Notice: Subject to any disclaimer, the term of this patent is extended or adjusted under 35 U.S.C. 154(b) by 124 days.

This patent is subject to a terminal disclaimer.

(21) Appl. No.: 16/146,149

(22) Filed: Sep. 28, 2018

(65) Prior Publication Data

US 2019/0097977 A1    Mar. 28, 2019

Related U.S. Application Data

(60) Provisional application No. 62/564,928, filed on Sep. 28, 2017.

(51) Int. Cl.
*H04L 29/06* (2006.01)
*G06F 21/53* (2013.01)
(Continued)

(52) U.S. Cl.
CPC .......... *H04L 63/0281* (2013.01); *G06F 21/53* (2013.01); *H04L 63/0209* (2013.01);
(Continued)

(58) Field of Classification Search
CPC ............ H04L 63/0281; H04L 63/0227; H04L 63/0218; H04L 63/0272; G06F 21/53; G06F 21/74
(Continued)

(56) References Cited

U.S. PATENT DOCUMENTS 7,478,330 B1    1/2009    Branson et al.
7,698,442 B1    4/2010    Krishnamurthy et al.
(Continued)

FOREIGN PATENT DOCUMENTS

RU          2406138 C1    12/2010

OTHER PUBLICATIONS

Barnet, Mark, "Praktikum Po Zaschite Seti Kompanii", Windows IT Pro/RE, Nov.-Dec. 2006, pp. 79-81.
(Continued)

*Primary Examiner* — Longbit Chai
(74) *Attorney, Agent, or Firm* — Condo Roccia Koptiw LLP

(57) ABSTRACT

A host computer system may be configured to connect to a network. The host computer system may be configured to implement a workspace and an isolated computing environment. The host computer system may be configured to isolate the isolated computing environment from the workspace using an internal isolation firewall. The host computer system may be configured to receive a request to communicate with a first network destination. On a condition that the first network destination is determined to be trusted, the processor may be configured to communicate with the first network destination via a first browser process executed in the workspace. On a condition that the first network destination is determined to be untrusted, the processor may be configured to communicate with the first network destination via a second browser process executed in the isolated computing environment.

20 Claims, 7 Drawing Sheets

(51) Int. Cl.
  *H04W 12/63* (2021.01)
  *H04W 12/088* (2021.01)

(52) U.S. Cl.
  CPC ........ *H04L 63/0853* (2013.01); *H04L 63/101* (2013.01); *H04W 12/088* (2021.01); *H04W 12/63* (2021.01); *G06F 2221/2149* (2013.01)

(58) Field of Classification Search
  USPC .......................................................... 726/12
  See application file for complete search history.

(56) References Cited

U.S. PATENT DOCUMENTS

| | | | |
|---|---|---|---|
| 7,805,516 | B2 | 9/2010 | Kettler et al. |
| 8,539,561 | B2 * | 9/2013 | Gupta ..................... G06F 21/62 726/6 |
| 9,386,021 | B1 * | 7/2016 | Pratt ....................... H04L 63/10 |
| 9,942,198 | B2 * | 4/2018 | Hoy ................... H04L 63/0272 |
| 2002/0069369 | A1 | 6/2002 | Tremain et al. |
| 2006/0070066 | A1 | 3/2006 | Grobman |
| 2007/0220187 | A1 | 9/2007 | Kates |
| 2007/0260873 | A1 | 11/2007 | Hatfalvi et al. |
| 2008/0028401 | A1 | 1/2008 | Geisinger |
| 2008/0201711 | A1 | 8/2008 | Amir Husain |
| 2008/0256536 | A1 | 10/2008 | Zhao et al. |
| 2009/0172781 | A1 | 7/2009 | Masuoka et al. |
| 2009/0328038 | A1 | 12/2009 | Yamada et al. |
| 2010/0138829 | A1 | 6/2010 | Hanquez et al. |
| 2010/0138830 | A1 | 6/2010 | Astete et al. |
| 2010/0223613 | A1 | 9/2010 | Schneider |
| 2010/0251329 | A1 | 9/2010 | Wei |
| 2012/0023593 | A1 | 1/2012 | Puder et al. |

OTHER PUBLICATIONS

Burnett, Mark, "How I Secured One Company's Network", Using Log Parser, Virtualization, and a Little Psychology, Sep. 17, 2006, 4 pages.

Laverick, Mike, "Hypervisor Management and Optimization for Advanced Virtualization", E-book, TechTarget, 2010, 13 pages.

Li et al., "VSITE: A Scalable and Secure Architecture for Seamless L2 Enterprise Extension in the Cloud", 6th IEEE Workshop on Secure Network Protocols (NPSec), Oct. 2010, pp. 31-36.

Reuben, Jenni Susan, "A Survey on Virtual Machine Security", TKK T-110.5290 Seminar on Network Security, Oct. 11-12, 2007, 5 pages.

Villeneuve, Nart, "Command and Control in the Cloud", Malware Explorer, Oct. 22, 2010, 3 pages.

Wikipedia, "Computer Networking", Available at https://en.wikipedia.org/wiki/Computer_network, Dec. 2010, 19 pages.

Wikipedia, "Computer Security", Available at https://en.wikipedia.org/wiki/Computer_security, retrieved on Dec. 2010, 27 pages.

Wikipedia, "Cyber Security Standards", Available at https://en.wikipedia.org/wiki/Cyber_security_standards, retrieved on Dec. 2010, 9 pages.

Wikipedia, "HTTP Secure", Available at https://en.wikipedia.org/wiki/HTTPS, retrieved on Dec. 2010, 9 pages.

Wikipedia, "Hypervisor", Available at <https://en.wikipedia.org/wiki/Hypervisor>, retrieved on Dec. 2010, 6 pages.

Wikipedia, "Internet Protocol", Available at https://en.wikipedia.org/wiki/Internet_Protocol, retrieved on Dec. 2010, 5 pages.

Wikipedia, "Multiprotocol Label Switching", Available at <https://en.wikipedia.org/wiki/Multiprotocol_Label_Switching>, retrieved on Dec. 2010, 8 pages.

Wikipedia, "Network Address Translation", Available at https://en.wikipedia,org/wiki/Network_address_translation, Dec. 2010, 12 pages.

Wikipedia, "Security-Focused Operating System", Available at https://en.wikipedia.org/wiki/Security-focused_operating_system, retrieved on Dec. 2010, 9 pages.

Wikipedia, "Virtual Desktop", Available at https://en.wikipedia.org/wiki/Virtual_desktop, retrieved on Dec. 2010, 5 pages.

Wikipedia, "Virtual Private Network", Available at http://en.wikipedia.org/wiki/Virtual_private_network, retrieved on Dec. 2010, 9 pages.

* cited by examiner

BROWSER SWITCHING SYSTEM AND METHODS

CROSS-REFERENCE TO RELATED APPLICATIONS

This application claims the benefit of U.S. Provisional Patent Application No. 62/564,928, filed Sep. 28, 2017, the contents of which is hereby incorporated by reference in its entirety.

BACKGROUND

Computer systems are designed to execute software applications and processes. One such application is an Internet browser (e.g., web browser). Internet browser applications allow users to view web content including web pages, video, chat rooms and other media from almost any source. Many web sites (or other network destinations) are known and are trusted not to contain malware. Other web sites, however, are unknown and untrusted. Browsing to such unknown sites can potentially subject the user's device to unwanted or harmful software, traditionally referred to as malware. Malware applications downloaded through browsing can compromise computer systems and render them unsafe for use. Elaborate defensive protections are implemented to protect computer systems; however such defensive protections are often costly and difficult to maintain. Unfortunately, even with these defensive systems in place, malware applications still reach the computer systems and the local networks to which they are attached.

SUMMARY

Methods and systems are disclosed for restricting web browser usage and correspondingly the extent to which files can be accessed and/or downloaded through web browsers. A host computer system may be configured to connect to a network. The host computer system may include a memory and a processor. The processor may be configured to implement a workspace and an isolated computing environment. The workspace may be configured to enable operation of a first set of one or more applications or processes via a first memory space. The isolated computing environment may be configured to enable operation of a second set of one or more applications or processes via a second memory space. The isolated computing environment may be configured to authenticate with an authorization device. The isolated computing environment may be a sandboxed computing environment enforced by a sandbox container process that enables the internal isolation firewall. The processor may be configured to isolate the isolated computing environment from the workspace using an internal isolation firewall. The internal isolation firewall may be configured to prevent data from being communicated between the isolated computing environment and the workspace, for example, without an explicit user input.

The processor may be configured to receive a request to communicate with a first network destination. The processor may be configured to receive the request via a web address entered into an instance of the first or second browser processes and/or a link selected in an electronic mail (Email), web page, or document. The processor may be configured to determine whether the first network destination is trusted or untrusted. On a condition that the first network destination is determined to be trusted, the processor may be configured to communicate with the first network destination via a first browser process executed in the workspace. On a condition that the first network destination is determined to be untrusted, the processor may be configured to communicate with the first network destination via a second browser process executed in the isolated computing environment.

The processor may be configured to determine that an instance of the first browser process operating in the workspace is attempting to communicate with an untrusted network destination. The processor may be configured to spawn an instance of the second browser process in the isolated computing environment for communication with the untrusted network destination. The instance of the second browser process may be configured to communicate with the untrusted network destination via a proxy device. The sandbox container process may be configured to determine that an instance of the second browser process operating in the isolated computing environment is attempting to communicate with a trusted network destination. The sandbox container process may be configured to spawn an instance of the first browser process in the workspace for communication with the trusted network destination. The instance of the first browser process may be configured to communicate with the trusted network destination via a router and/or a border firewall. The processor may be configured to determine whether the first network destination is trusted or untrusted based on one or more of a whitelist including a list of trusted network destinations or a blacklist including a list of untrusted network destination.

DETAILED DESCRIPTION

Figure 1:
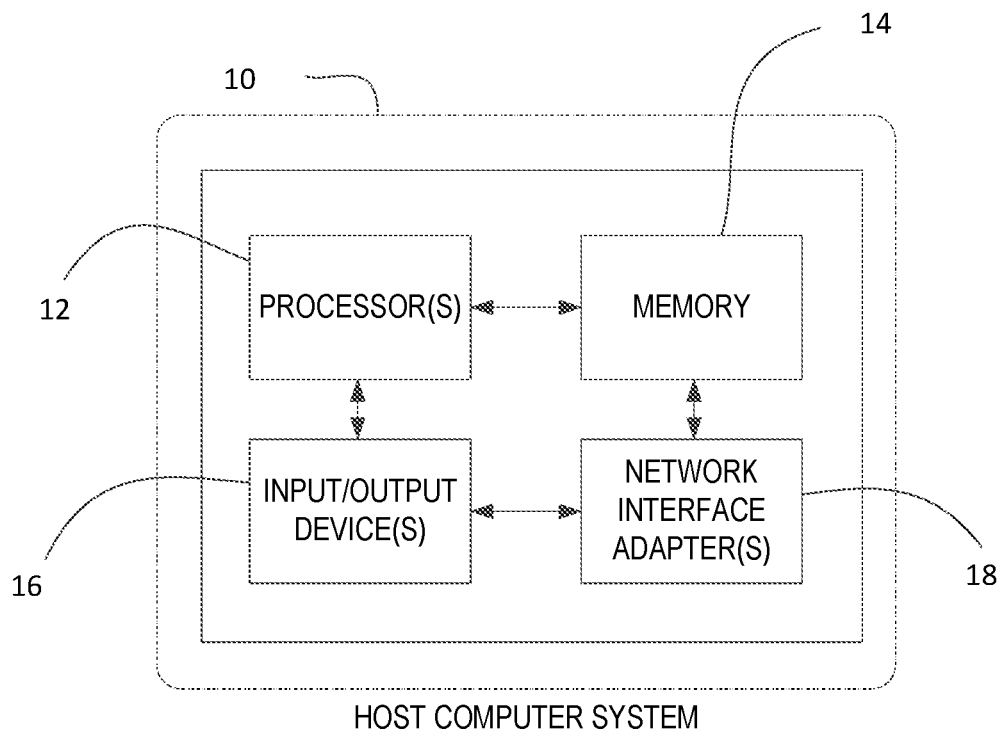
FIG. 1 illustrates an example host computer system.

Embodiments described herein are generally directed to methods for restricting web browser usage and correspondingly the extent to which files can be accessed or downloaded through the web browsers. In one embodiment, for example, a process running on a host computer system instantiates an isolated computing environment. The isolated computing environment may be a segregated and protected memory space (e.g., a sandbox environment) in which to run one or more processes. The isolated computing environment may be referred to herein as a sandbox and/or container. The host monitors communication (e.g., via a sandbox firewall process, or sandbox firewall) requests for new connections to other devices arising out of the sandbox. After a request is detected, the sandbox firewall process determines if the requested destination is considered trusted or untrusted. The sandbox firewall process also determines if the requesting process is running within or outside of a sandbox environment.

Web browser applications (e.g., web browser, or browser), for example, may be used to send such communication requests. Depending on whether the communication requests are intended for trusted network destination or untrusted network destinations, the host computer system (e.g., via a sandbox firewall) may choose an appropriate executable environment in which the web browser is to be run, and then execute the browser in the appropriate environment in order to satisfy the URL request.

In another embodiment, the sandbox firewall process ensures that requests to untrusted network destinations are handled by processes within (e.g., fully contained within) a sandbox environment, starting a new process as required. Likewise, the sandbox firewall ensures that requests to trusted network destinations are handled by processes outside (e.g., fully contained outside) of a sandbox environment, (trusted memory space), starting a new process as required. This process control and potential switching to a new memory environment and/or processes is performed without any required user interaction.

For instance, if a communication request is intended for a trusted network destination, the sandbox firewall ensures the browser executable files are run within the trusted memory space (e.g., outside of a sandbox) of the host computer system. If the communication request is intended for an untrusted network destination, the sandbox firewall ensures the browser executable files are run within a sandbox on the trusted host computer system.

In examples, the host computer system may allow (e.g., only allow) access to untrusted network destinations using browser processes, for example, running within a sandbox.

Malware programs including viruses and worms are introduced to a computing device or network through a variety of attack vectors. If a malicious user can get a user on computing device to select a web link (e.g. embedded in an email, on a web page, entered into a web browser by the user, etc.), the user's browser may open a web page that may use scripts or other constructs to surreptitiously install malware on the user's computer system. The malware may then provide its author a variety of capabilities, including, but not limited to, data exfiltration, command and control, network reconnaissance, creation of a staging platform for additional malware or attacks, or any other capability the author can envision. The embodiments herein thwart such attempts at gaining access to a computer system by analyzing each web URL that is selected and then determining whether that web page or web destination is trusted or untrusted. Different browser instances are used to process trusted and untrusted destinations, in order to ensure that the user's computer system is protected.

FIG. 1 illustrates an example of a host computer system that may implement one or more applications in a sandboxed environment. For example, a Host Computer System 10 may include one or more Processor(s) 12, Memory 14, one or more Input and/or Output (I/O) Devices 16, and one or more Network Interface Adapter(s) 18. Generally, the Host Computer System 10 may be any computing device capable of communicating over a network and/or performing processing tasks. Although the examples set forth herein may be described in terms general purpose computing workstations, the systems and methods disclosed herein may be equally applicable to any computing device or communication device for which internet isolation is desired. For example, the systems and methods disclosed herein may be applicable for providing sandbox-based internet isolation for cell phones, pagers, personal computers (PCs), laptops, vehicles, kiosks, facilities, servers, workstations, tablets, smartphones, routers, controllers, microcontrollers, and/or any other processing and/or communication device.

Processor(s) 12 may include one or more of a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), a state machine, and/or the like. The Processor(s) 12 may perform data processing, input/output processing, instantiate operating system(s), execute application(s), and/or any other functionality that enables the use of sandbox isolation of one or more applications and/or processes.

Memory 14 may include volatile and/or non-volatile memory. Memory 14 may include read-only memory (ROM), random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs), and/or the like. Memory 14 may be configured to store computer readable instructions that when implemented by Processor(s) 12 may cause Processor(s) 12 to implement one or more of the functions or procedures described herein. For example, Memory 14 may be configured to store software code implemented by Processor(s) 12 that instantiate a restricted operating system environment for operation of the sandboxed browser and/or other sandboxed applications(s) and/or process(es). The software may restrict sandbox-based access to one more file descriptors, memory, file system space, etc. For example, the applications and/or processes operating within the sandboxed computing environment may be permitted to certain portions of Memory 14 but may not be allowed access to other portions of Memory 14. As an example, Memory 14 may be partitioned into a first memory space and a second memory space. The first memory space may be configured to enable storage and/or operation of a workspace configured to execute a first set of one or more applications and/or processes running on the operating system of the Host Computer System 10. The second memory space may be configured to enable storage and/or operation of a second set of one or more applications and/or processes running within the sandboxed computing environment. The sandboxed computing environment may be enforced via a sandbox container process. The sandbox container process may segregate the workspace associated with the first memory space from the sandboxed computing environment associated with the second memory space. For example, the sandbox container process may include an internal isolation firewall. The internal isolation firewall may enforce the segregation of the first and second memory spaces.

The Host Computer System 10 may include I/O Device(s) 16. The I/O Devices 16 may include one or more of a monitor, keyboard, mouse, touchscreen interface, digital camera, a digital display, a graphical user interface, and/or the like. The I/O Device(s) 16 can allow user interaction with the Host Computer System 10, for example to allow certain interactions between an application or a process operating within the sandboxed computing environment and non-sandboxed resources.

The Network Interface Adapter(s) 18 may be configured to allow communication between the Host Computer System 10 and other devices. The Network Interface Adapter(s) 18 may include one or more wired and/or wireless communication devices.

The sandbox container process may be configured to protect the host computer system from one or more malware toolsets. For example, the Network Interface Adapter(s) 18 may include one or more of a modem, Ethernet adapter, radio, wired and/or wireless transceiver, computer port, network socket, network interface controller, and/or the like. The Processor(s) 12 may maintain rules related to access to the Network Interface Adapter(s) 18 for both access via the sandboxed computing environment and via the workspace. Further, the Processor(s) 12 may enforce a host-based firewall that implements additional rules related to access to the Network Interface Adapter(s) 18.

Figure 2A:
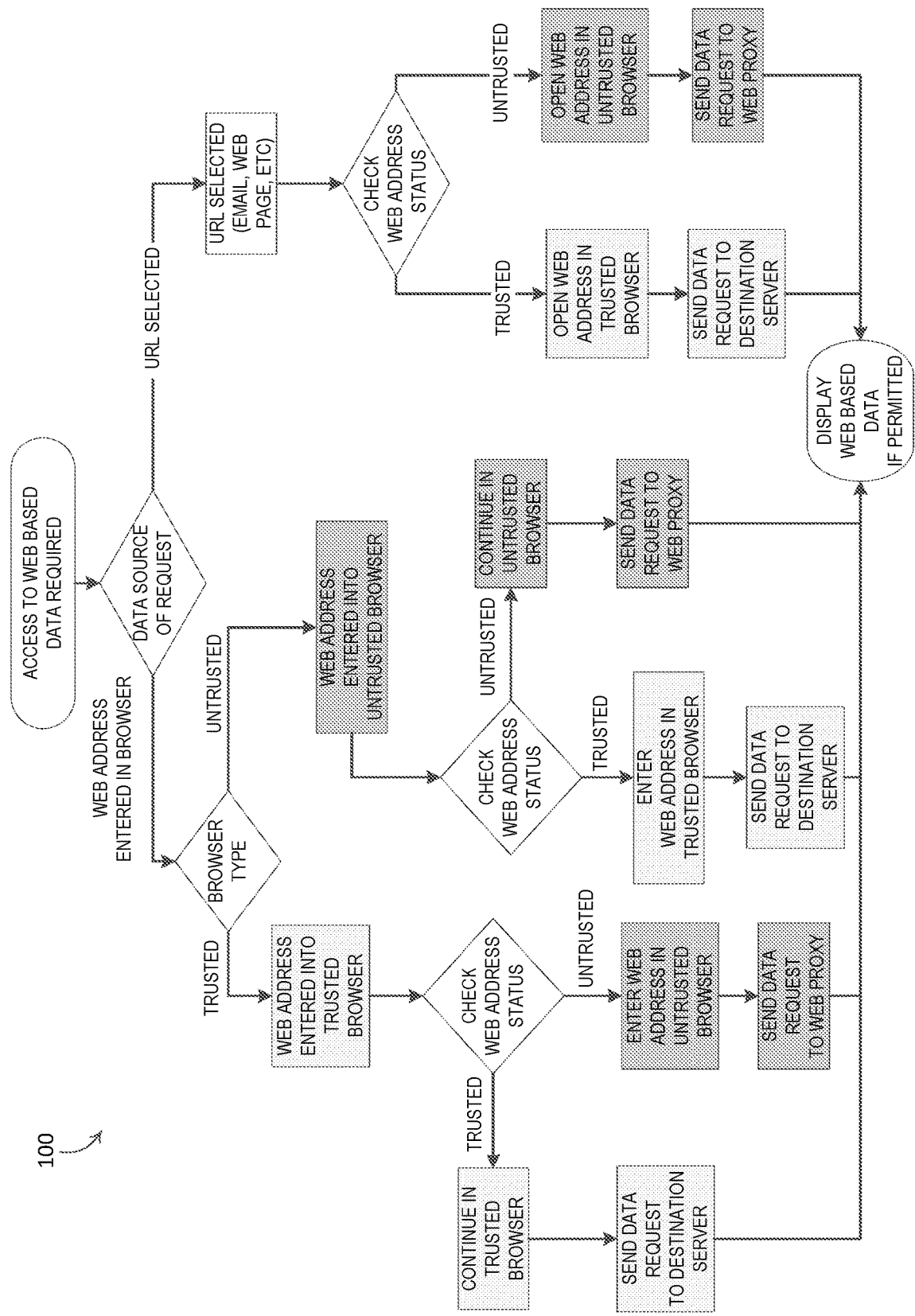
FIG. 2A illustrates a flowchart of an example method for monitoring and controlling communications in trusted and untrusted computer networking environments.
Figure 2B:
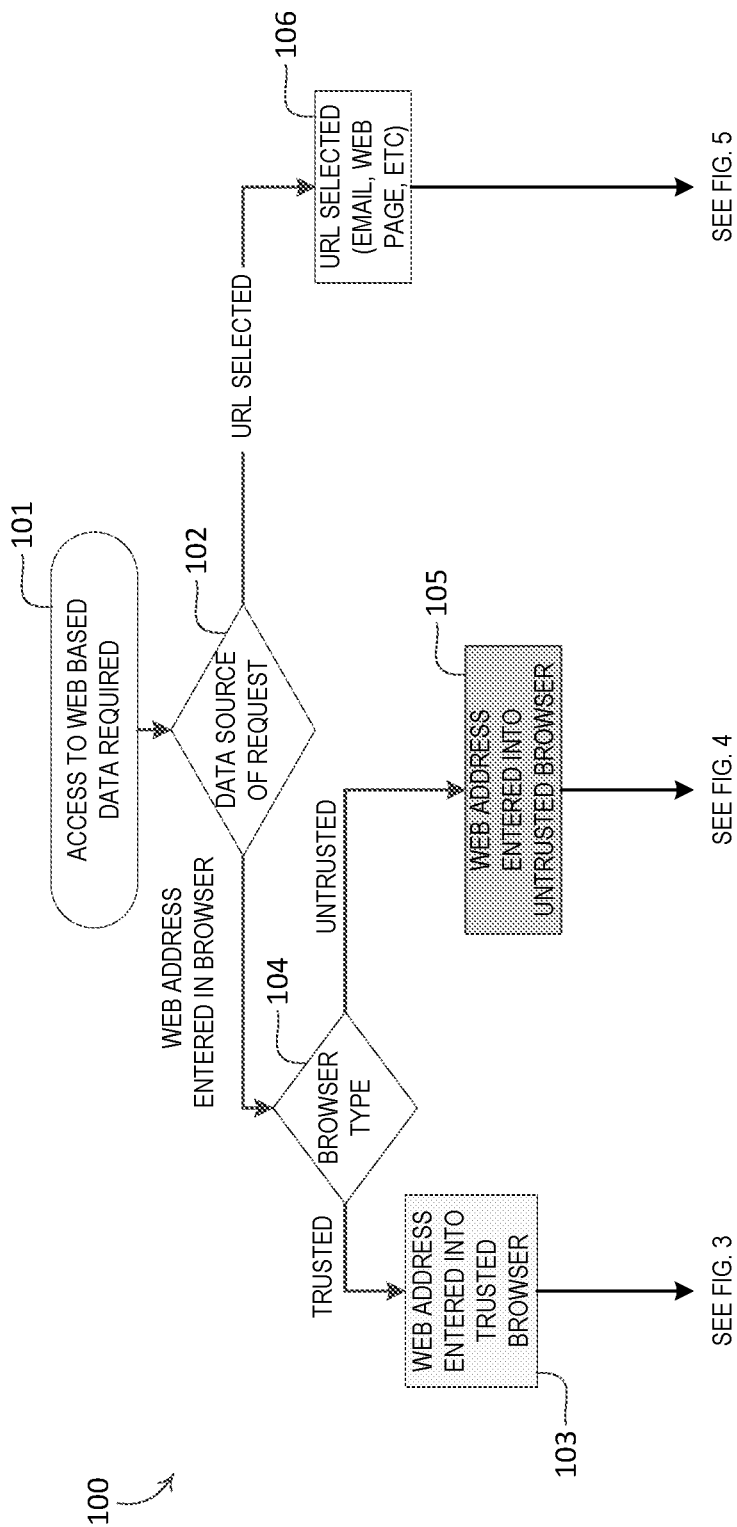
FIG. 2B illustrates a first portion of the flowchart of the example method for monitoring and controlling communications in trusted and untrusted computer networking environments in which a URL is either entered or selected at a trusted or untrusted browser process.

FIG. 2A depicts a process overview in which a method 100 for monitoring and controlling communications in trusted and untrusted computer networking environments is performed. The method 100 may include many different paths. Each of these paths may be broken down into smaller sections, as shown in FIG. 2B. For example, a process started at 101 of method 100, may flow through FIG. 2B, FIG. 3, FIG. 4, and/or FIG. 5 as described herein. Any or all of these methods (or portions thereof) may use a computer networking environment such as computer environment 500 shown in FIG. 6.

In FIG. 2B, method 100 starts at 101 where a user or application on a host computer system (e.g. host computer system 510 of FIG. 6) requests access to web data. At 102, the host computer system determines the source of the data request: either the URL was entered in a browser (e.g. by typing or pasting "www.xyz.com" into the browser's navigation bar), or the URL was selected by clicking on or touching a hyperlink. If the URL was entered into the browser, the host computer system determines at 104 whether the URL was entered into a trusted browser, that is a browser process running within the "trusted memory space" of the host computer system 103 (e.g., workspace 513 shown in FIG. 6), or within "untrusted memory space" 105 (e.g., isolated computing environment 517 shown in FIG. 6), or a "sandbox environment", or "segregated memory space."

As understood herein, a "sandbox environment" or "sandbox" comprises a segregated memory space (also referred to as an "untrusted memory space"), while a "trusted memory space" comprises a memory space on a computer system that is not segregated, and in some cases essentially comprises all of the remaining memory space on the host computer system that is not set apart as the sandbox environment.

In any case, if the host computer system (e.g., via the sandbox firewall, as understood more fully below) determines that the URL was entered in a trusted browser, the flowchart continues to FIG. 3. If the host computer system determines that the URL was entered into an untrusted browser (e.g., a browser process operating in the sandbox), the flowchart continues to FIG. 4. In general, the host computer system (e.g., host computer system 510, FIG. 6) may use a firewall such as a software-based or "sandbox" firewall to perform monitoring and/or determination relevant to destination classification and process switching, as discussed herein. For example, the host computer system may instantiate a sandbox firewall and corresponding listener that intercepts URL requests arising from either the sandbox or trusted memory space environments.

As used herein, a "trusted browser" or "trusted application" refers to an application running on the host computer system's operating system. An "untrusted browser" or "untrusted application" refers to an application that is run in a segregated memory space environment (e.g., it is run in a sandbox). Based on the network destination classification (such as a trusted or untrusted network), the browser executable is run within the protected, trusted computer system's trusted memory space environment (e.g., operating system) or within a segregated memory space environment (e.g., within a sandbox). For network destinations classified as trusted, the application may process communication requests in a trusted browser process that is run within the operating system. In contrast, for network destinations classified as untrusted, the application may process communication requests in an untrusted browser process that is run within, or in connection with, a sandbox environment.

Figure 3:
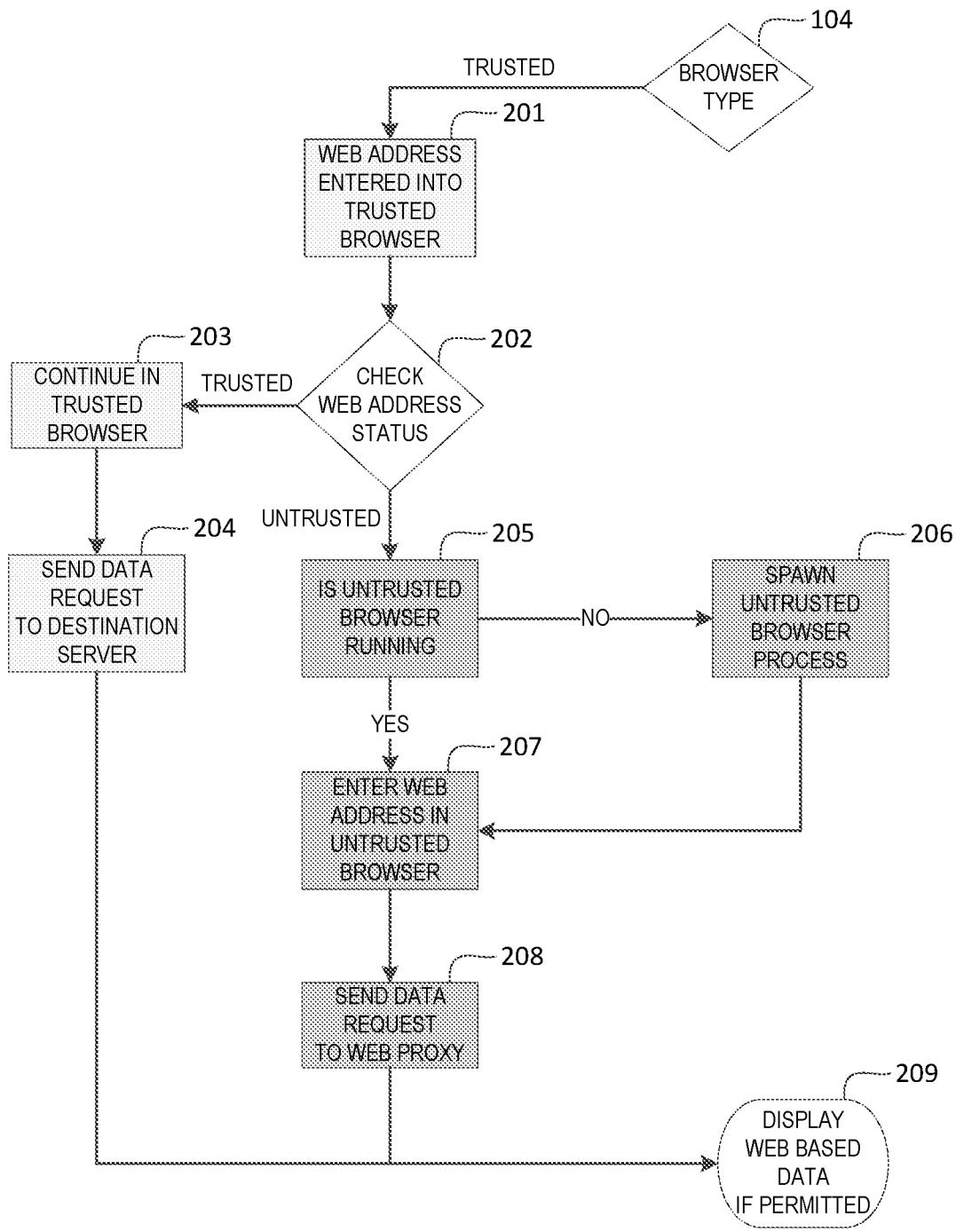
FIG. 3 illustrates a second portion of the flowchart of the example method for monitoring and controlling communications in trusted and untrusted computer networking environments in which a URL is entered into a browser process running within the trusted memory space of a computing device.

For example, as shown in FIG. 3, a user or application may request communication with an outside entity using a trusted browser 201, as selected at 104 in FIG. 2. A sandbox firewall (see 202) that listens to or otherwise operates in connection with the segregated memory space environment (or "sandbox" herein) checks the URL link's status at 202. If the URL link is to a trusted domain, the sandbox firewall allows the trusted browser to follow the link at 203, and the communication request is sent to the destination server at 204. The requested web-based data is then displayed in the trusted browser at 209.

On the other hand, if the URL link is to an untrusted domain, the sandbox firewall determines whether an untrusted browser is currently running at 205. If an untrusted browser process is currently running, the URL request is passed to said process for processing at 207. If not, the sandbox firewall starts a new untrusted browser process within a sandbox at 206. The sandbox firewall then passes the selected URL request into the newly created untrusted browser process at 207, and the communication request is sent to a web proxy at 208. The web proxy is configured to block those browser requests to untrusted destinations that do not come from a properly authenticated sandboxed browser.

It should be noted that, in the embodiments herein, various types of firewalls may be used in conjunction with a web proxy (e.g., proxy device 506 shown in FIG. 6) and other network devices. The sandbox firewall is a firewall installed to essentially surround and govern the in/out-bound communications of one or more applications (local software) installed on the host computer system and executed within a sandbox or "container" herein. Thus, a sandbox firewall may be distinguished from an operating system firewall (or "host-based" firewall) in that the sandbox firewall is meant to regulate the sandbox itself, and applications operating therein.

Meanwhile, the host-based firewall governs all (or serves as a barrier to) activity between any application on the computer system (whether in or out of a sandbox) and the network. The host-based firewall may be implemented using software that is, at least in some cases, commercially available such as that provided by SYMANTEC OR MCAFFEE. The host-based firewall may also or alternatively be implemented using software built into the operating system of the trusted host computer system. Additionally or alternative, the host-based firewall may be implemented using software that configures and/or implements restrictive ingress and/or egress policies on the trusted host computer system.

One or more barrier firewalls (or perimeter firewalls), such as a network firewall that governs communications, such as at a network router, may be used between the host computer system and other computer systems on the network. One will appreciate that the term "firewall" can be understood to comprise any combination of software and/or hardware components needed to execute the purposes stated herein.

Figure 4:
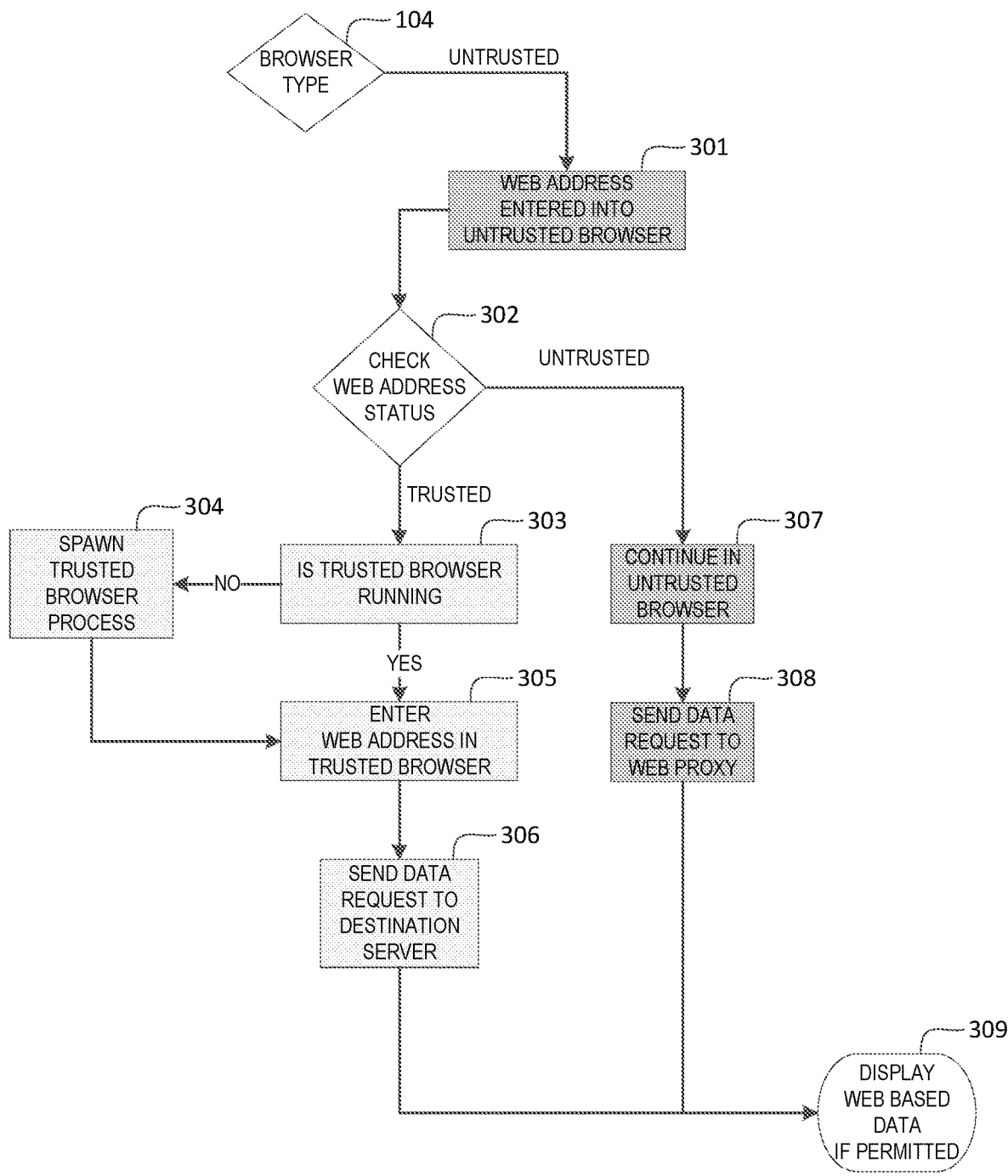
FIG. 4 illustrates a third portion of the flowchart of the example method for monitoring and controlling communications in trusted and untrusted computer networking environments in which a URL is entered into a browser process running within the untrusted, segregated memory space of a computing device.

In FIG. 4, a user or application may request communication with an outside entity using an untrusted browser at 301. A sandbox firewall (e.g., internal isolation firewall 511, FIG. 6) listening to or otherwise operating in connection with a sandbox (e.g., isolated computing environment 517, FIG. 6) on the host computer system (e.g., host computer system 510, FIG. 6) checks the URL status at 302 to determine whether the URL is to a trusted domain or to an untrusted domain. If the URL is to a trusted domain, the sandbox firewall determines whether a trusted browser is currently running at 303. If a trusted browser process is currently running, the URL request is passed to said process for processing at 305. If not, the host computer system, via the sandbox firewall, starts a new trusted browser process at 304. The sandbox firewall then passes the selected URL request into the newly created trusted browser process at 305. The communication request is then sent to its destination at 306, and the host computer system displays the requested data in the trusted browser at 309.

If the URL points to an untrusted domain, the untrusted, sandboxed browser continues to attempt to process the communication request at 307. The untrusted browser sends its request for data to a web proxy at 308. Because the sandboxed browser is properly authenticated with the web proxy, the web proxy forwards the communication to the untrusted destination. For example, the sandboxed browser may establish an authenticated connection to the web proxy. This authenticated connection allows the untrusted browser to send user-initiated communications to untrusted web sites or visit other untrusted internet destinations.

Figure 5:
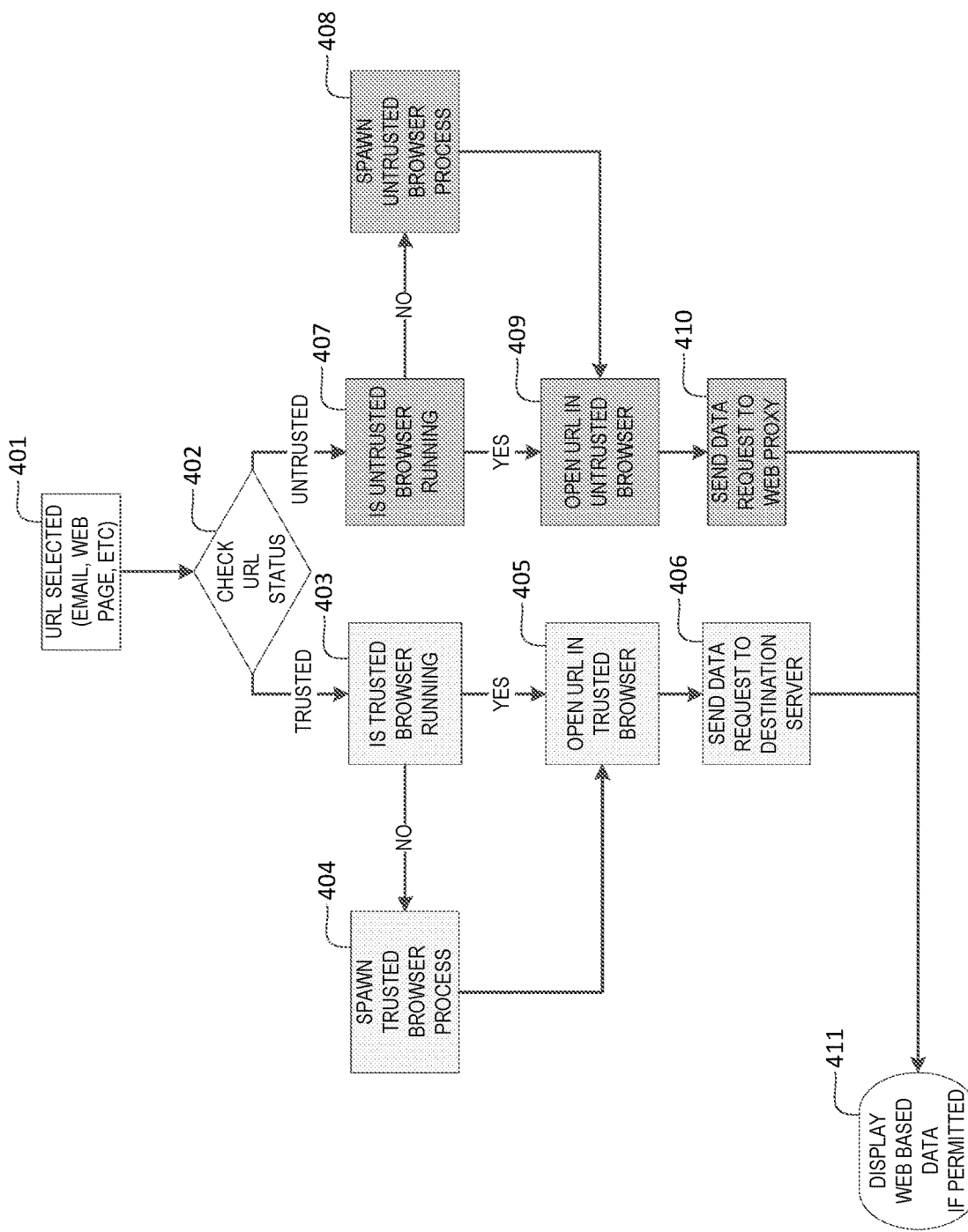
FIG. 5 illustrates a fourth portion of the flowchart of the example method for monitoring and controlling communications in trusted and untrusted computer networking environments in which a URL is selected at a browser process that is either trusted or untrusted.

In FIG. 5, a URL is selected at a browser process whereby a sandbox firewall listening to or otherwise operating in connection with a sandbox (e.g., isolated computing environment 517, FIG. 6) on the host computer system (e.g., host computer system 510, FIG. 6) checks the URL status at 402 to determine whether the URL is to a trusted domain or to an untrusted domain, such as by checking the requested URL against a whitelist, blacklist, etc. If the URL points to a trusted domain at 403, the host computer system determines whether a trusted browser process is currently running on the host computer system and passes the URL to the trusted browser process. Thus, one will appreciate in view of the present specification and claims that the sandbox firewall may be configured to listen to all browser traffic on the host computer system, whether URL requests emanate from the trusted or untrusted memory spaces.

If the sandbox firewall determines that a trusted browser is not running, the sandbox firewall starts a new trusted browser process within trusted memory space environment (e.g., within its operating system) at 404 and the URL request is passed to the new process for processing at 405. If a trusted browser process is already running, the sandbox firewall passes the URL request to said process for processing at 405. The trusted browser process, new or otherwise currently running, at 405 sends the data request to the destination server at 406. Because the data request was sent from a trusted browser and is directed towards a trusted network, the request will be allowed to exit the network and retrieve the data from the web site at 411.

If the sandbox firewall running in connection with the sandbox determines that the URL is an untrusted domain at 402, the sandbox firewall determines whether an untrusted browser process is running within a sandbox at 407. If not, a new untrusted browser process and sandbox process is started at 408 and the URL is passed to the new process for processing at 409. If an untrusted browser, within an existing sandbox is already running, the URL request is passed to said process at 409. The untrusted browser process, new or otherwise currently running, at 409 sends the data request to a web proxy at 410, which allows the communication because the sandbox that contains the browser will be properly authenticated with the web proxy. Thus, in such cases, the untrusted network is accessed (e.g., only accessed) from within a sandboxed browser that has authenticated to the web proxy.

In summary, each time a user or application (including malicious applications) attempts to follow a URL, whether initiated from a browser, email application, word processing application or other application, the sandbox firewall of the host computer system will classify the network destination of the URL as trusted or untrusted. This classification may be performed by a standalone process (e.g., the sandbox firewall) operating in isolation, or by multiple processes operating in conjunction (e.g. with a virtual machine (VM) or another sandboxed application). Then, based on the network destination classification as trusted or untrusted, the host computer system forwards the URL request to a browser executable (or other application executable) within the associated trusted or untrusted environment. If an existing process is not currently running within the appropriate environment, then the standalone process initiates a new process in the appropriate environment to execute the request.

If the network destination is a trusted domain, the host computer system may run the browser executable within a browser that is executed directly within the device operating system, or within another appropriate container, such as a more permissive namespace. If the network destination is an untrusted domain, the host computer system runs the browser executable within the segregated memory space (e.g., within the sandbox) with limited permissions. The sandbox application which classifies the network destination is responsible for starting the browser executable in the correct environment for the requested URL as required. This is performed automatically according to the network destination classification. In examples, no user interaction is required.

The host computer system then attempts to open the requested URL in the designated space. In examples, the host computer system attempts to open the untrusted URL in an existing untrusted browser process running within a sandbox. Because the URL is untrusted and being attempted from within a sandboxed browser, the request is forwarded to a proxy device (e.g., a web proxy). The web proxy determines if the communication request originated from a properly authenticated sandbox environment. In examples, the web proxy also determines if the requested URL is on a blacklist. If the requested URL is not on a blacklist and the sandbox environment is properly authenticated, the web proxy forwards the communication to the destination URL.

In examples, the host computer system attempts to open a requested URL classified as trusted. The host computer system attempts to open the URL in an existing sandboxed browser process running within the segregated memory space. Because the URL is classified as trusted, the host computer system stops the URL request and opens it either in an existing trusted browser process or a newly started trusted browser process running directly within the trusted device's trusted memory space environment (e.g., within the operating system of the host computer system). By avoiding use of the sandbox environment when possible, the host computer system may save computer processing resources.

Running the browser process within the segregated memory space, as required (e.g., only for untrusted network destinations), may minimize the usage of the sandbox environment and reduces overall resource usage of the trusted host computer system. This also positively affects other applications and/or processes, as additional resource usage may be avoided for trusted URLs. The host computer system may permit (e.g., only permit) access to untrusted network destinations via processes running with the segregated memory space. Because the process of switching between an unsecure browser and a secure browser is automated, the host computer system can operate in a more secure manner overall.

Even if a malware process tries to send off a data request or tries to exfiltrate data from the network or sends a request to a command and control server to assume control of the host computer system, the data request may be flagged as being directed to an untrusted destination and/or may be transferred to an untrusted browser within a sandbox. This effectively breaks any communications between the malware process and any external devices.

In examples, a sandbox firewall prevents processes running on the trusted memory space environment (e.g., the operating system) from communicating data into the segregated memory space environment (e.g. a sandbox environment). As such, even if an operating system (e.g., operating in the trusted memory space) is infected with malware, and that malware feeds an untrusted URL link to the host computer system, the host computer system (via the listening sandbox firewall) will identify the link as untrusted, and pass link to an untrusted browser operating in the sandbox environment. The sandbox firewall will then prevent the malware from passing any data into the sandbox environment or receiving any data from the sandbox environment. Under such conditions, the malware will be unable to either exfiltrate data to or receive commands for a nefarious actor.

Figure 6:
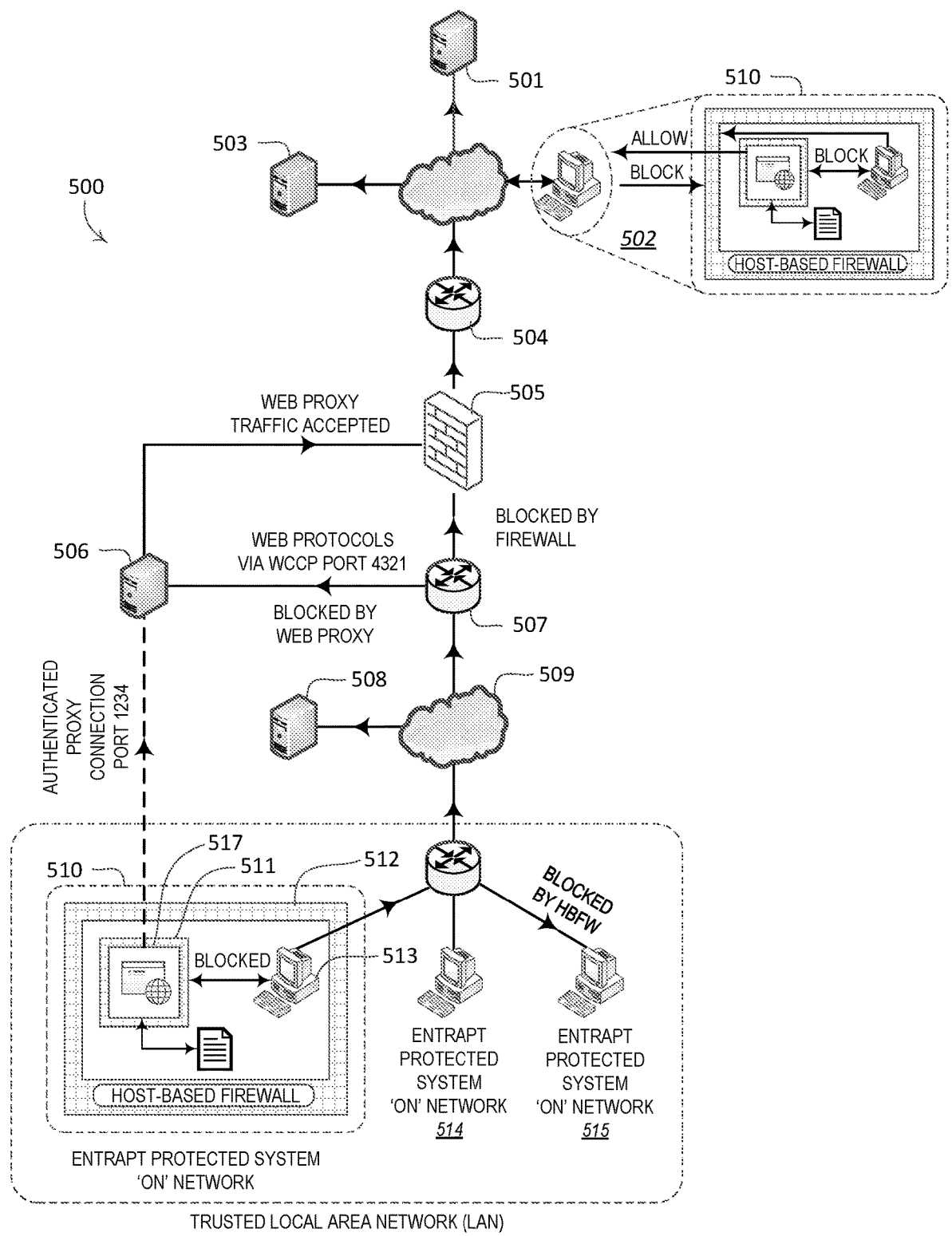
FIG. 6 illustrates a computer architecture in which embodiments described herein may operate.

Each of the embodiments described above with reference to FIGS. 2-5 may be operated in the computing environment 500 of FIG. 6. FIG. 6 illustrates a resilient network architecture solution, which protects against malware, utilizing many different security enhancements. As noted above, at least one of these security enhancements includes an isolated computing environment 517 (e.g., a sandbox) that uses an internal isolation firewall 511 (e.g., a sandbox firewall). The sandbox implements web proxy authentication, which allows access to the open internet. Moreover, internet access is permitted (e.g., only permitted) through proxy device 506 using an, application operating in the sandbox 517, such as an untrusted browser. If requests come to the proxy device 506 that are not properly authenticated or are from an application in the trusted memory space (e.g., outside of sandbox 517) and not explicitly permitted, the requests will be denied. If requests come to the web proxy listing a network destination that has been identified on a blacklist as a forbidden destination, the requests will be blocked by the web proxy 506. On the other hand, if requests come to the web proxy 506 listing a network destination that is identified on a whitelist as preapproved, those requests will be allowed through the web proxy.

Still further, the host computer system may be location-aware. As such, the host computer system may determine when it is on a protected or trusted network (e.g. at 510), and when it is on an untrusted network (e.g. at 502). When the host computer system is on an untrusted network 502, sandboxed browsing (e.g., only sandboxed browsing) may be permitted. Moreover, host firewall protection is increased. Even when the host computer system is on a trusted network 510, the host computer system may be prevented from openly communicating with other computer systems such as 514 and 515 by a firewall ingress policy implemented in host-based firewall 512 (e.g., the local firewall encompassing all memory spaces on the host computer system 513.

Similarly, the host computer system may be allowed or prevented from communicating with server 508 through trusted network 509. If, for example, a user or malicious program tries to communicate out to the internet through the trusted network 509 using non-web-based protocols, the request will be blocked by the border firewall 505 (or by a perimeter firewall). If, for example, a request leaving the host computer system, uses web protocol requests, the request will be rerouted by the router 507 to the proxy device 506, where the request will be dropped, unless it explicitly permitted. Authenticated requests sent from a sandboxed browser may be sent from the web proxy 506 through the border firewall 505 to the border router 504 where they are routed to untrusted servers (e.g. 503). The border firewalls are configured to allow (e.g., only allow) internet access to whitelist-approved websites, or to allow access via the web proxy 506. Access to the internet from all other devices on the network, except predetermined devices via predetermined network ports are automatically dropped.

In examples, system 500 is configured so that all externally bound web protocols from internal hosts are automatically directed to the web proxy on a specific port, such as 4321. In some cases, the location of this "redirection" is a router just prior to the border firewall (e.g. router 507). With the exception of traffic bound for whitelisted destinations or traffic received from an authenticated container, all other traffic received by the web proxy is automatically dropped. Thus, within the network, all outbound web-based internet traffic is allowed (e.g., only allowed) through the tightly-controlled web proxy, greatly limiting the ability for malware to reach outside the network. This leads to a much quieter network that is easier to maintain and monitor. Moreover, requests that appear out of the ordinary are easy to identify and stop, as they likely come from a malicious or unknown program.

Access to the web proxy requires encrypted authentication credentials, to which malware programs would not have access. Utilization of the web proxy to gain internet access may be provided via a secondary port, such as 1234. All improperly authenticated or unauthenticated traffic received on this port would be automatically dropped. Authenticated access to the web proxy is available (e.g., only available) using a sandboxed application, such as a browser. Authentication credentials, encrypted or not encrypted, may be stored in configuration files, whether locally or in other network-accessible locations. These configuration files, encrypted or unencrypted, that store the authentication credentials are loaded on startup or restart of the sandbox.

The sandbox firewall 511 prevents non-allowed data or data requests between the host computer system trusted memory space, including the operating system of the host computer system and the sandbox. All other connectivity between the sandbox and other memory space of the host computer system is blocked. In examples, non-allowed data or data requests comprises any data or data requests that are not explicitly initiated and/or allowed by user action. For example, in examples, applications, such as a browser, that run within the container must access certain system resources (e.g., memory management APIs, user-interface APIs, etc.). Each of these required resources are listed in the whitelist such that the application is able to properly function. In contrast, with data and data requests that are not on a whitelist or specifically denied, such as on a blacklist, the sandbox firewall blocks the data or data request.

By being location aware, a host computer system may determine whether it is connected to a secured network ("on" network 510) or connected to an "unsecure" network ("off" network 502). The host-based firewall permits browser traffic from untrusted browsers operating in the sandbox 517 to exit the host computer system when off network according to policies and settings governing when such traffic is permitted. The host-based firewall also permits authorized virtual private network (VPN) clients to exit the endpoint computer when off network. The host-based firewall drops all other traffic including malware trying to exit the endpoint computer when off network.

As previously discussed, the sandbox firewall may be configured to automatically create a browser process within a sandbox when the endpoint computer is off of the trusted network. In examples, the sandbox firewall automatically creates a browser process within the sandboxed environment for all destinations considered "untrusted" when the endpoint computer is either on a trusted network or is off a trusted network. The sandbox firewall may also be configured to automatically create a browser process within the host computer system for all destinations considered "trusted" when the endpoint computer is either on a trusted network or is off a trusted network.

In cases where a sandbox environment is compromised, the host computer system may revert the sandbox environment to a known good image, thereby removing any malware a malicious user may have added. This may happen on a periodic basis (e.g. daily), or by user request, or if the container is considered infected. As such, any adversary would need to re-enter the network, increasing the likelihood that the malware may be detected. When a malware application attempts to communicate with other computer systems in the network (e.g. lateral movement), these attempts are prevented by a host-based firewall that refuses all incoming connections. Exceptions may include incoming connections for whitelisted destinations, preapproved devices on preapproved ports. The malware may attempt to exit through the web proxy or directly through the firewall, such as a border firewall, but all traffic is dropped from internal hosts from these devices. A remaining (e.g., the only remaining) path is to exit through a sandboxed application, but the sandbox firewall refuses all automated connections into or out of the sandbox.

Because these embodiments are location-aware, laptops, tablets and other mobile devices are protected both "on" and "off" secure network. Should an attacker gain access to a host with malware designed to wait for an unfiltered internet connection, the host-based firewall will still block the malware from connecting to the internet, hence protecting the data. Employees are still able to surf the internet through the sandboxed browser.

On occasions where a direct internet connection is required, a whitelist exception process may allow for such a connection. However, even these types of access can be tightened using configurable access controls. For instance, an administrator may limit the access to a third or fourth level domain, limit the address to the employees who require it and/or add a user agent string so only that person or application has access.

The embodiments described herein may be implemented on various types of computing systems. As noted above, these computing systems may, for example, be mobile phones, electronic appliances, laptop computers, tablet computers, wearable devices, desktop computers, mainframes, and the like. As used herein, the term "computing system" includes any device, system, or combination thereof that includes at least one processor, and a physical and tangible computer-readable memory capable of having thereon computer-executable instructions that are executable by the processor. A computing system may be distributed over a network environment and may include multiple constituent computing systems (e.g. a cloud computing environment). In a cloud computing environment, program modules may be located in both local and remote memory storage devices.

As described herein, a computing system may include communication channels that allow the computing system to communicate with other message processors over a wired or wireless network. Such communication channels may include hardware-based receivers, transmitters or transceivers, which are configured to receive data, transmit data or perform both. Embodiments described herein also include physical computer-readable media for carrying or storing computer executable instructions and/or data structures. Such computer-readable media may be any available physical media that can be accessed by a general-purpose or special purpose computing system.

System architectures described herein may include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Accordingly, methods, systems and computer program products are provided which control communications according network destination classification. The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed:

1. A host computer system configured to connect to a network, the host computer system comprising:

a memory; and a processor configured to:
- implement a workspace, wherein the workspace is configured by a host operating system to enable operation of a first set of one or more applications or processes via a first memory space;
- implement an isolated computing environment, the isolated computing environment using the host operating system, comprising a sandboxed computing environment that uses a second memory space to enable operation of a second set of one or more applications or processes, and being configured to authenticate with an authorization device, wherein the second memory space is separate from the first memory space;
- isolate the isolated computing environment from the workspace using an internal isolation firewall, the internal isolation firewall being configured to prevent data from being communicated between the isolated computing environment and the workspace without an explicit user input;
- receive a request to communicate with a first network destination;
- determine whether the first network destination is trusted or untrusted;
- on a condition that the first network destination is determined to be trusted, communicate with the first network destination via a first browser process executed in the workspace; and
- on a condition that the first network destination is determined to be untrusted, communicate with the first network destination via a second browser process executed in the isolated computing environment.

2. The host computer system of claim 1, wherein the sandboxed computing environment is enforced by a sandbox container process that enables the internal isolation firewall.

3. The host computer system of claim 2, wherein the sandbox container process is configured to:
- determine that an instance of the first browser process operating in the workspace is attempting to communicate with an untrusted network destination; and
- spawn an instance of the second browser process in the isolated computing environment for communication with the untrusted network destination.

4. The host computer system of claim 3, wherein the instance of the second browser process is configured to communicate with the untrusted network destination via a proxy device.

5. The host computer system of claim 4, wherein the isolated computing environment is further configured to authenticate with the authorization device to enable communication with the untrusted network destination via the proxy device.

6. The host computer system of claim 2, wherein the sandbox container process is configured to:
- determine that an instance of the second browser process operating in the isolated computing environment is attempting to communicate with a trusted network destination; and
- spawn an instance of the first browser process in the workspace for communication with the trusted network destination, wherein the instance of the first browser process is configured to communicate with the trusted network destination via one or more of a router or a border firewall.

7. The host computer system of claim 1, wherein the processor is configured to determine whether the first network destination is trusted or untrusted based on one or more of a whitelist comprising a list of trusted network destinations or a blacklist comprising a list of untrusted network destinations.

8. The host computer system of claim 7, wherein the processor is configured to switch between the first browser process to communicate with trusted network destinations and the second browser process to communicate with untrusted network destinations based on whether the first network destination is included on the whitelist or the blacklist.

9. The host computer system of claim 1, wherein the processor is configured to prevent, using a host-based firewall, communication between the host computer system and one or more other devices on the network.

10. The host computer system of claim 1, wherein the processor is configured to receive the request via a web address entered into an instance of the first browser process or the second browser process or a link selected in an electronic mail (Email), web page, or document.

11. A method performed by a host computing system to connect to a network, the method comprising:
- operating a trusted browser process in a workspace of the host computer system, the workspace configured by a host operating system to enable operation of a first set of one or more applications or processes via a first memory space;
- isolate the workspace from an isolated computing environment that uses the host operating system, wherein the workspace comprises a sandboxed computing environment that uses a second memory space separate from the first memory space to enable operation of a second set of one or more applications or processes and wherein the workspace is configured to authenticate with an authorization device;
- receiving a request to communicate with a network destination;
- determining whether the network destination is trusted or untrusted;
- on a condition that the network destination is determined to be trusted, communicating with the network destination via the trusted browser process operating in the workspace; and
- on a condition that the network destination is determined to be untrusted, spawning an untrusted browser process in the isolated computing environment and communicating with the network destination via the untrusted browser process in the isolated computing environment.

12. The method of claim 11, wherein the isolated computing environment is isolated from the workspace using an internal isolation firewall, the internal isolation firewall being configured to prevent data from being communicated between the isolated computing environment and the workspace without an explicit user input.

13. The method of claim 11, wherein the request comprises a web address entered into the trusted browser process or a link selected in a web page displayed via the trusted browser process.

14. The method of claim 11, wherein the trusted browser process is configured to communicate with a trusted network destination via one or more of a router or a border firewall, and wherein the untrusted browser process is configured to communicate with an untrusted network destination via a proxy device.

15. The method of claim 14, further comprising authenticating the isolated computing environment with the authorization device for communicating with the untrusted network destination via the proxy device.

16. A method performed by a host computing system to connect to a network, the method comprising:

operating an untrusted browser process in an isolated computing environment of the host computer system, the isolated computing environment using a host operating system, comprising a sandboxed computing environment that uses a first memory space to enable operation of a first set of one or more applications or processes, configured to authenticate with an authorization device, and isolated from a workspace that is configured by the host operating system to enable operation of a second set of one or more applications or processes via a second memory space that is separate from the first memory space;

receiving a request to communicate with a network destination;

determining whether the network destination is trusted or untrusted;

on a condition that the network destination is determined to be untrusted, communicating with the network destination via the untrusted browser process operating in the isolated computing environment; and on a condition that the network destination is determined to be trusted, spawning a trusted browser process in the workspace and communicating with the network destination via the trusted browser process in the workspace.

17. The method of claim 16, wherein the isolated computing environment is isolated from the workspace using an internal isolation firewall, the internal isolation firewall being configured to prevent data from being communicated between the isolated computing environment and the workspace without an explicit user input.

18. The method of claim 16, wherein the request comprises a web address entered into the untrusted browser process or a link selected in a web page displayed via the untrusted browser process.

19. The method of claim 16, wherein the trusted browser process is configured to communicate with a trusted network destination via one or more of a router or a border firewall, and wherein the untrusted browser process is configured to communicate with an untrusted network destination via a proxy device.

20. The method of claim 19, further comprising authenticating the isolated computing environment with the authorization device for communicating with the untrusted network destination via the proxy device.

\* \* \* \* \*